United States Patent
Song et al.

(10) Patent No.: US 8,807,159 B2
(45) Date of Patent: Aug. 19, 2014

(54) CORROSION-RESISTANT ARMATURE AND VALVE FOR ANTI-LOCK BRAKE SYSTEMS

(75) Inventors: Guangling Song, Troy, MI (US); Jan F. Herbst, Grosse Pointe Woods, MI (US); Mark W. Verbrugge, Troy, MI (US); Yar-Ming Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 312 days.

(21) Appl. No.: 13/094,890

(22) Filed: Apr. 27, 2011

(65) Prior Publication Data

US 2012/0273710 A1    Nov. 1, 2012

(51) Int. Cl.
  *F16L 7/00*  (2006.01)
  *F16K 31/02* (2006.01)
  *F16K 1/42*  (2006.01)

(52) U.S. Cl.
  USPC ....... 137/375; 251/129.15; 251/359; 251/368

(58) Field of Classification Search
  CPC .... F16K 27/0272; F16K 1/42; F16K 31/0658
  USPC ............. 137/375; 251/129.15, 368, 359, 360; 303/119.2
  See application file for complete search history.

(56) References Cited

U.S. PATENT DOCUMENTS

| | | | |
|---|---|---|---|
| 4,005,733 A * | 2/1977 | Riddel | 137/625.4 |
| 4,527,744 A * | 7/1985 | Hafner et al. | 239/585.3 |
| 6,390,443 B1 * | 5/2002 | Katayama et al. | 251/129.15 |
| 6,609,698 B1 * | 8/2003 | Parsons et al. | 251/129.17 |
| 6,776,391 B1 * | 8/2004 | Goossens et al. | 251/129.15 |
| 6,808,160 B2 * | 10/2004 | Hayakawa et al. | 251/129.02 |
| 7,051,961 B2 * | 5/2006 | Mills et al. | 239/585.4 |
| 7,198,334 B2 * | 4/2007 | Katayama | 303/119.2 |
| 2005/0072950 A1 * | 4/2005 | Tojo et al. | 251/129.15 |
| 2006/0097210 A1 | 5/2006 | Fong et al. | |
| 2008/0252140 A1 | 10/2008 | Lee | |

FOREIGN PATENT DOCUMENTS

| | | |
|---|---|---|
| CN | 1563764 A | 1/2005 |
| CN | 201448461 U | 5/2010 |
| CN | 201513267 U | 6/2010 |

OTHER PUBLICATIONS

First Office Action mailed by the State Intellectual Property Office of the People's Republic of China on Jan. 24, 2014 for Chinese Patent Application No. 201210128819.7.

* cited by examiner

*Primary Examiner* — Kevin Murphy
(74) *Attorney, Agent, or Firm* — Quinn Law Group, PLLC

(57) ABSTRACT

A valve for an anti-lock brake system, wherein the anti-lock brake system is configured for controlling flow of a fluid, includes a housing defining a cavity therein and having a longitudinal axis, a valve seat disposed within the cavity so as to define a first passage for the fluid, and an armature disposed within the cavity so as to at least partially define a second passage for the fluid. The armature is translatable with respect to the valve seat along the longitudinal axis and matable with the valve seat to seal off fluid communication between the first passage and the second passage. The armature defines a surface that is substantially resistant to corrosion from the fluid, and the surface is substantially free from a coating including zinc.

19 Claims, 2 Drawing Sheets

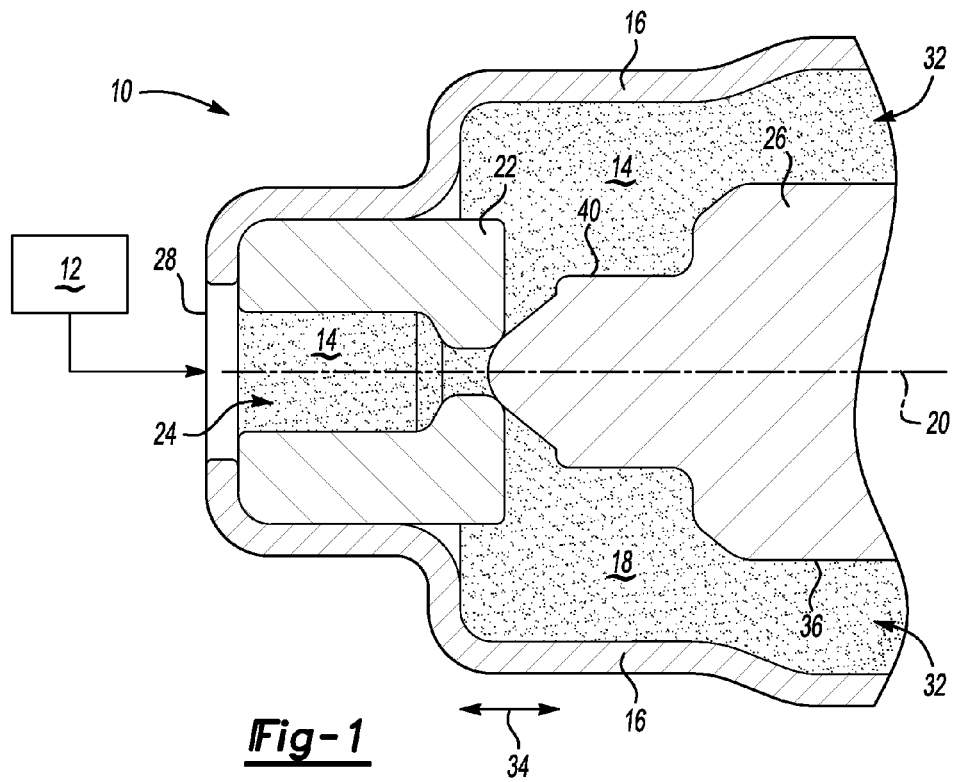
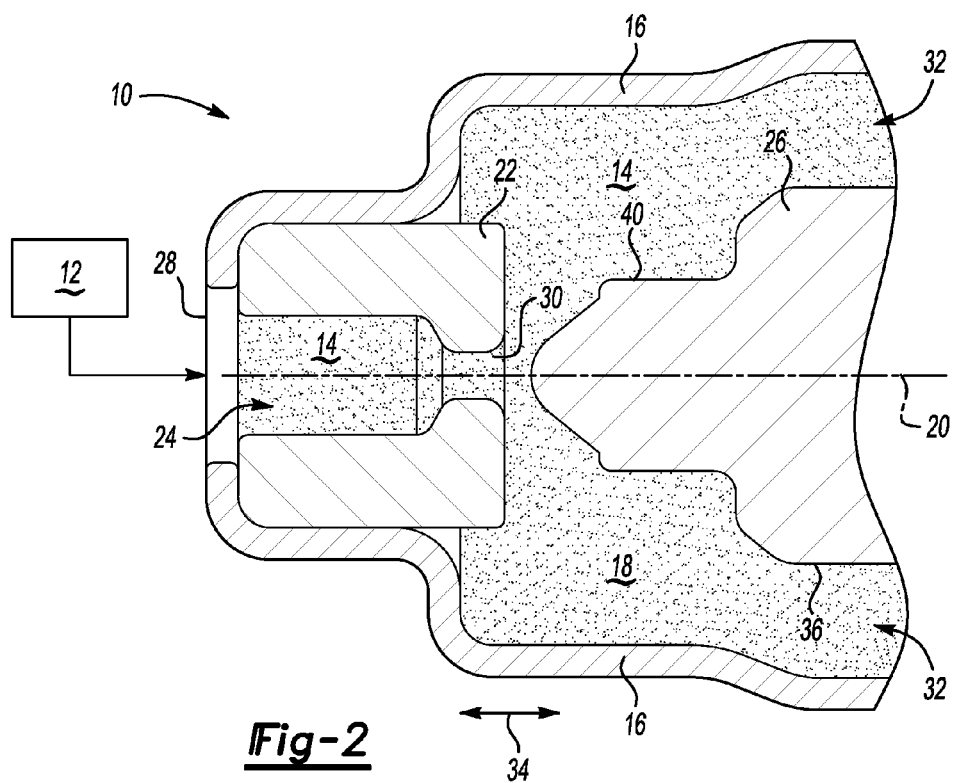

CORROSION-RESISTANT ARMATURE AND VALVE FOR ANTI-LOCK BRAKE SYSTEMS

TECHNICAL FIELD

The present disclosure generally relates to valves, and more specifically, to armatures for valves.

BACKGROUND

Vehicle anti-lock brake systems operate to modify brake pressure during emergency braking. Such modified brake pressure allows each wheel of the vehicle to continue rotating without wheel lock-up and/or loss of traction during emergency braking.

Vehicles equipped with anti-lock brake systems generally include an electronic control unit that continuously monitors the rotational speed of each vehicle wheel. A vehicle wheel that is rotating at a significantly different speed than other vehicle wheels may indicate impending wheel lock-up and/or loss of traction during braking. Under such a condition, the electronic control unit may actuate one or more fluid valves to thereby modify hydraulic brake pressure at the affected wheel until each vehicle wheel again rotates at a similar speed.

SUMMARY

A valve for an anti-lock brake system, wherein the anti-lock brake system is configured for controlling flow of a fluid, includes a housing. The housing defines a cavity therein and has a longitudinal axis. The valve further includes a valve seat disposed within the cavity so as to define a first passage for the fluid, and an armature disposed within the cavity so as to at least partially define a second passage for the fluid. The armature is translatable with respect to the valve seat along the longitudinal axis, and matable with the valve seat to seal off fluid communication between the first passage and the second passage. Further, the armature defines a surface that is substantially resistant to corrosion from the fluid, and the surface is substantially free from a coating including zinc.

An armature for a valve of an anti-lock brake system, wherein the valve of the anti-lock brake system is configured for controlling flow of a fluid, defines a surface that is substantially resistant to corrosion from the fluid, and free from a coating including zinc.

The above features and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic fragmentary cross-sectional illustration of a valve for an anti-lock brake system disposed in a closed position, wherein the valve includes an armature disposed in contact with a valve seat to seal off fluid communication within the valve;

FIG. 2 is a schematic fragmentary cross-sectional illustration of the valve of FIG. 1 disposed in an open position, wherein the valve includes the armature disposed apart from the valve seat to allow fluid communication within the valve;

DETAILED DESCRIPTION

Figure 3:
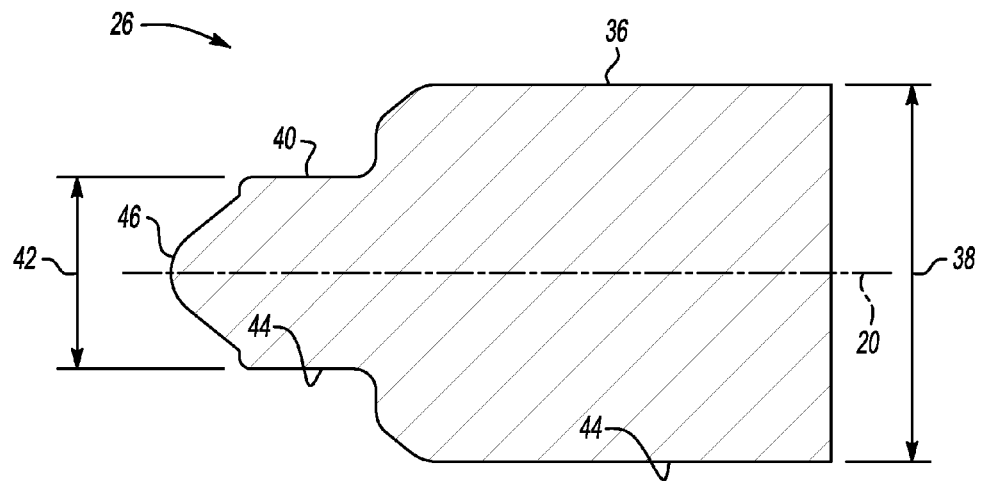
FIG. 3 is a schematic cross-sectional illustration of the armature of the valves of FIGS. 1 and 2.

Referring to the Figures, wherein like reference numerals refer to like elements, a valve 10 for an anti-lock brake system 12 is shown generally in FIG. 1. Although shown generally, as understood by one skilled in the art, the anti-lock brake system 12 may be configured for controlling flow of a fluid 14, such as, but not limited to, brake fluid, hydraulic fluid, and/or pressurized air, and as such may be useful for modifying brake pressure at a vehicle wheel (not shown) that is rapidly accelerating or decelerating during emergency vehicle braking. As such, the valve 10 may be useful for automotive applications. However, the valve 10 may also be useful for non-automotive applications requiring fluid control, such as traction control systems and stability control systems for industrial or recreational vehicles.

By way of general explanation, the valve 10 may be a component of a fluid communication path of the anti-lock brake system 12 of a vehicle (not shown). Although not shown in FIG. 1, the anti-lock brake system 12 may include various sensors, processors, and/or electronic control units that may selectively actuate the valve 10 to control flow of the fluid 14 through the valve 10 and the anti-lock brake system 12. In one embodiment, the valve 10 may be a normally-closed release valve for the anti-lock brake system 12. Although, the description set forth herein may apply to other types of valves 10, including normally-open valves.

Referring now to FIG. 1, the valve 10 includes a housing 16 defining a cavity 18 therein and having a longitudinal axis 20. That is, the housing 16 may be a sleeve or other device configured for containing the operational components of the valve 10, as set forth in more detail below. As such, the housing 16 may be substantially hollow to define the cavity 18 therein. In one example, the housing 16 may be generally cylindrical. The housing 16 may be formed from any material suitable for the operational environment of the valve 10. For example, the housing 16 may be formed from metal or a composite.

Referring again to FIG. 1, the valve 10 also includes a valve seat 22 disposed within the cavity 18 so as to define a first passage 24 for the fluid 14. That is, the fluid 14 may be flowable within the first passage 24. As set forth in more detail below, the valve seat 22 may act as a stop for an armature 26 during operation of the valve 10. As such, the valve seat 22 may have any shape. For example, as shown in FIG. 2, the first passage 24 may taper from an inlet 28 to an outlet 30 along the longitudinal axis 20 of the valve 10. Further, the valve seat 22 may have a shape that is complementary to the shape of the armature 26 and may be configured to mate with the armature 26 during operation of the valve 10, as set forth in more detail below.

With continued reference to FIG. 1, the valve 10 further includes the armature 26 disposed within the cavity 18 so as to at least partially define a second passage 32 for the fluid 14. For example, as shown in FIG. 1, the armature 26 may be disposed adjacent the valve seat 22 within the cavity 18 along the longitudinal axis 20. As such, the armature 26 may also have a generally cylindrical shape so as to at least partially define the second passage 32 when the armature 26 is disposed within the cavity 18.

As best shown in FIGS. 1 and 2, during operation of the valve 10, the armature 26 is translatable with respect to the valve seat 22 along the longitudinal axis 20 and matable with the valve seat 22 to seal off fluid communication between the first passage 24 and the second passage 32. That is, when the valve 10 is actuated by, for example, the electronic control unit (not shown) in response to a signal from one or more sensors (not shown), the armature 26 may translate in the direction of arrows 34 (FIGS. 1 and 2) along the longitudinal axis 20. When the valve is actuated to the closed position as shown in FIG. 1, the armature 26 is disposed adjacent and in contact with the valve seat 22 so that fluid 14 may not flow from the first passage 24 to the second passage 32. That is, the armature 26 seals off fluid communication between the first and second passages 24, 32 when the valve 10 is actuated to the closed position. In contrast, when the valve 10 is actuated to the open position as shown in FIG. 2, the armature 26 is disposed apart from the valve seat 22 so that fluid 14 may flow between the first passage 24 and the second passage 32. That is, when the valve 10 is actuated to the open position, the armature 26 allows fluid communication between the first and second passages 24, 32. Such fluid communication, in turn, may increase or decrease fluid pressure to, for example, a vehicle wheel (not shown) during vehicle braking.

Figure 4:
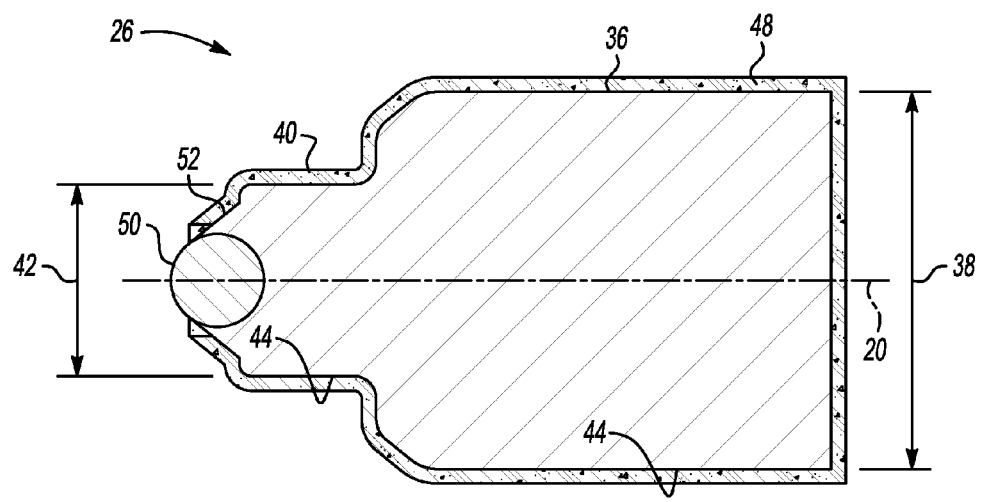
FIG. 4 is a schematic cross-sectional illustration of another embodiment of the armature of FIG. 3.

Referring now to FIGS. 3 and 4, the armature 26 may include a body portion 36 having a first diameter 38, and a mating portion 40 connectable to the body portion 36 and having a second diameter 42 that is less than the first diameter 38. Therefore, the body portion 36 may occupy more volume of the cavity 18 (FIGS. 1 and 2) than the mating portion 40 when disposed within the housing 16 (FIGS. 1 and 2). Stated differently, the armature 26 may taper along the longitudinal axis 20. Further, the mating portion 40 may be configured for seating against the valve seat 22 to seal off fluid communication between the first passage 24 and second passage 32 during operation of the valve 10, as set forth in more detail below. In one example, as shown in FIGS. 3 and 4, the mating portion 40 may have a frusto-conical shape.

With continued reference to FIGS. 3 and 4, the armature 26 defines a surface 44 that is substantially resistant to corrosion from the fluid 14 (FIGS. 1 and 2). As used herein, the terminology "corrosion" refers to a disintegration of a material into its constituent atoms due to chemical reactions with its surroundings. Corrosion may be caused by oxidation and/or other chemical reactions, and may destroy or irreversibly damage the material. However, in this instance, although the fluid 14 may be corrosive, the surface 44 of the armature 26 is substantially resistant to corrosion from the fluid 14, as set forth in more detail below.

In addition, the surface 44 is substantially free from a coating including zinc. For example, the surface 44 does not include a galvanic coating. As used herein, the terminology "galvanic coating" refers to a zinc carbonate coating formed by hot-dipping or coating the surface 44 with a thin zinc layer and/or metallurgical bond between zinc and the surface 44 to provide the surface 44 with protection from corrosion. More specifically, the terminology refers to the zinc carbonate passive film coating that may reduce a corrosion rate, but not permanently prevent corrosion, of the surface 44 upon exposure to the fluid 14. As such, the surface 44 is substantially free from pinholes (not shown) commonly present in the coating including zinc.

Referring again to FIG. 3, in one embodiment, the armature 26 is formed from non-austenitic stainless steel, i.e., magnetic stainless steel, so that the surface 44 is substantially resistant to corrosion from the fluid 14, and the surface 44 contacts the fluid 14 within the second passage 32. For example, the armature 26 may be formed from an alloy of iron and carbon that includes about 1 part by weight of carbon based on 100 parts by weight of the alloy, and may be magnetic or a ferritic stainless steel. Further, the non-austenitic stainless steel may have a Curie point of greater than or equal to about 600° C. Therefore, the surface 44 and armature 26 may be permanently corrosion-resistant. For this embodiment, the armature 26 may be free from any coating so that the surface 44 directly contacts the fluid 14 (FIGS. 1 and 2) within the second passage 32 (FIGS. 1 and 2) during operation of the valve 10 (FIGS. 1 and 2).

With continued reference to FIG. 3, in this embodiment, the armature 26 may define a tip 46 that is configured for mating with the valve seat 22 to seal off fluid communication between the first passage 24 (FIGS. 1 and 2) and the second passage 32 (FIGS. 1 and 2). The tip 46 may have a substantially rounded shape and may be integral with the armature 26. For example, the tip 46 may be spherical and may not be formed separately from the armature 26. Therefore, the armature 26 may alleviate the need for a separate spherical ball assembly (not shown) at the tip 46 of the armature 26. Rather, the tip 46 may be defined by the armature 26 and be integrally formed with the armature 26. Referring to FIGS. 1 and 2, during operation of the valve 10, as the armature 26 translates along the longitudinal axis 20, the tip 46 may mate and seat against the valve seat 22 to seal off fluid communication between the first and second passages 24, 32.

Referring now to FIG. 4, in another embodiment, the armature 26 may be formed from mild steel. As used herein, the terminology "mild steel" refers to a type of carbon-steel containing less than about 0.25 parts by weight carbon based on 100 parts by weight of the carbon-steel. Suitable examples of mild steel include American Iron and Steel Institute (AISI) grades 1005 through 1025.

As shown in FIG. 4, in this embodiment, the surface 44 may not contact the fluid 14 within the second passage 32 (FIGS. 1 and 2). That is, the surface 44 may not be directly exposed to the fluid 14 during operation of the valve 10 (FIGS. 1 and 2). Rather, the valve 10 may further include a protectant 48 disposed on the surface 44 so that the surface 44 is substantially resistant to corrosion from the fluid 14, wherein the protectant 48 contacts the fluid 14 within the second passage 32. For example, the protectant 48 may be a coating, film, or layer capable of protecting the surface 44 from corrosion upon exposure to the fluid 14 during operation of the valve 10. The protectant 48 may be applied to the surface 44 in any suitable manner. For example, the surface 44 may be dipped, coated, and/or sprayed with the protectant 48. Further, the protectant 48 may be non-reactive with the fluid 14. That is, the protectant 48 may not react chemically with the fluid 14. Therefore, the protectant 48 may not corrode, degrade, oxidize, etch, and/or dissolve in the presence of the fluid 14.

The protectant 48 may be substantially free from zinc. That is, the protectant 48 may not be classified as a zinc-based coating, such as a galvanization coating. Therefore, the surface 44 may not be galvanized and yet may still be substantially resistant to corrosion upon prolonged exposure to the fluid 14 (FIGS. 1 and 2). Rather, in one non-limiting example, the protectant 48 may include nickel. For example, the protectant 48 may be a non-magnetic nickel plating, such as a nickel, nickel-iron, and/or nickel-copper plating. Further, the protectant 48 as nickel-iron may be co-deposited with a layer of stainless steel (not shown). In this embodiment, in addition to providing corrosion-resistance, the protectant 48 may provide the surface 44 of the armature 26 with excellent wear-resistance as compared to a coating including zinc (not shown).

In another non-limiting example, the protectant 48 may be a layer of oxide. For example, the protectant 48 may result from a bluing treatment of the surface 44. As used herein, the terminology "bluing treatment" refers to an electroless treatment process for metal. For example, the surface 44 may be dipped in a solution of a caustic metallic base, e.g., sodium hydroxide, and an antioxidant, e.g., sodium nitrite, at a temperature of from about 100° C. to about 180° C., e.g., about 115° C. to about 165° C., for from about 5 minutes to about 35 minutes, to thereby deposit a layer of oxide, i.e., the protectant 48, on the surface 44. The bluing treatment may be characterized as "hot", i.e., performed at a temperature of greater than or equal to about 100° C., or "cold", i.e., performed at temperature of less than about 100° C. In this example, the resulting protectant 48 may have a blue-black color and may be a layer of oxide. Therefore, the surface 44 may be protected from oxidation and corrosion by a layer of, for example, magnetite ($Fe_3O_4$), the black oxide of iron. The resulting protectant 48 may also be referred to as "rust blue" and/or "fume blue". In addition, in this non-limiting example, the protectant 48 may have a thickness of less than or equal to about 25 microns, wherein 1 micron equals $1\times10^{-6}$ meters. That is, the protectant 48 may be a very thin coating on the surface 44 of the armature 26. As such, re-design of the geometry and shape of the armature 26 is not required to accommodate the protectant 48.

With continued reference to FIG. 4, in this embodiment, the valve 10 further includes a spherical member 50 that is attachable to an end 52 of the armature 26 and configured for mating with the valve seat 22 to seal off fluid communication between the first passage 24 (FIGS. 1 and 2) and the second passage 32 (FIGS. 1 and 2). For example, the spherical member 50 may be formed from stainless steel. The spherical member 50 or stainless steel ball may be separate from the armature 26 and attachable to the end 52 of the armature 26. The spherical member 50 may be configured for mating with the valve seat 22. For example, during operation of the valve 10, as the armature 26 translates along the longitudinal axis 20, the spherical member 50 may mate and seat against the valve seat 22 to seal off fluid communication between the first and second passages 24, 32.

The valve 10 and armature 26 are corrosion-resistant to fluid 14, such as brake fluid, and yet do not include a galvanic protective coating. As such, the valve 10 and armature 26 have an excellent operational life and are economical to manufacture. In addition, the valve 10 and armature 26 are wear-resistant and do not require geometric changes for operation within anti-lock brake systems 12.

While the best modes for carrying out the disclosure have been described in detail, those familiar with the art to which this disclosure relates will recognize various alternative designs and embodiments for practicing the disclosure within the scope of the appended claims.

We claim:

1. A valve for an anti-lock brake system, wherein the anti-lock brake system is configured for controlling flow of a fluid, the valve comprising:
   a housing defining a cavity therein and an inlet therethrough, wherein said housing has:
      a longitudinal axis;
      a first inner surface spaced apart from said longitudinal axis;
      a second inner surface disposed parallel to said first inner surface and defining said inlet, wherein said second inner surface is disposed between said first inner surface and said longitudinal axis;
      a shoulder surface interconnecting and disposed perpendicular to said first inner surface and said second inner surface;
      wherein said first inner surface, said second inner surface, and said shoulder surface define said cavity;
   a cylindrical valve seat disposed entirely within said cavity so as to define a first passage for the fluid;
   wherein said cylindrical valve seat has a first end disposed in contact with said second inner surface, a second end spaced apart from said first end and defining an outlet disposed entirely within said cavity, and an outer wall disposed in contact with said second inner surface and interconnecting said first end and said second end;
   wherein said shoulder surface is disposed between said first end and said second end such that said second end is longitudinally spaced apart from said shoulder surface along a first axis that is parallel to said longitudinal axis, and such that said second end is radially spaced apart from said first inner surface along a second axis that is perpendicular to said longitudinal axis; and
   an armature disposed within said cavity so as to at least partially define a second passage for the fluid;
   wherein said armature has a tip that is configured for mating with said second end at said outlet;
   wherein said armature is translatable with respect to said cylindrical valve seat along said longitudinal axis so that said tip mates with said second end entirely within said cavity to seal off fluid communication between said first passage and said second passage;
   wherein said armature has a surface that is substantially resistant to corrosion from the fluid;
   wherein said surface is free from a coating including zinc.

2. The valve of claim 1, wherein said armature is formed from non-austenitic stainless steel so that said surface is substantially resistant to corrosion from the fluid, and said surface contacts the fluid within said second passage.

3. The valve of claim 2, wherein said tip has a substantially rounded shape and is integral with said armature.

4. The valve of claim 1, wherein said armature is formed from mild steel and said surface does not contact the fluid within said second passage.

5. The valve of claim 4, wherein said tip is a spherical member that is attachable to an end of said armature and configured for mating with said cylindrical valve seat to seal off fluid communication between said first passage and said second passage.

6. The valve of claim 4, further including a protectant disposed on said surface so that said surface is substantially resistant to corrosion from the fluid, wherein said protectant contacts the fluid within said second passage.

7. The valve of claim 6, wherein said protectant is free from zinc.

8. The valve of claim 7, wherein said protectant includes nickel.

9. The valve of claim 7, wherein said protectant is non-reactive with the fluid.

10. The valve of claim 9, wherein said protectant is a layer of oxide.

11. An armature for a valve of an anti-lock brake system, wherein the valve of the anti-lock brake system is configured for controlling flow of a fluid and includes:
   a housing defining a cavity therein and an inlet therethrough, wherein the housing has:
      a longitudinal axis;
      a first inner surface spaced apart from the longitudinal axis;
      a second inner surface disposed parallel to the first inner surface and defining the inlet, wherein the second inner surface is disposed between the first inner surface and the longitudinal axis;
      a shoulder surface interconnecting and disposed perpendicular to the first inner surface and the second inner surface;

wherein the first inner surface, the second inner surface, and the shoulder surface define the cavity; and a cylindrical valve seat disposed entirely within the cavity;

wherein the cylindrical valve seat has a first end disposed in contact with the second inner surface, a second end spaced apart from the first end and defining an outlet disposed entirely within the cavity, and an outer wall disposed in contact with the second inner surface and interconnecting the first end and the second end;

wherein the shoulder surface is disposed between the first end and the second end such that the second end is longitudinally spaced apart from the shoulder surface along a first axis that is parallel to the longitudinal axis, and such that the second end is radially spaced apart from the first inner surface along a second axis that is perpendicular to the longitudinal axis, the armature comprising:

a tip configured for mating with the second end at the outlet; and a surface that is substantially resistant to corrosion from the fluid and free from a coating including zinc;

wherein said armature is translatable with respect to the cylindrical valve seat along the longitudinal axis so that said tip mates with the second end entirely within the cavity.

12. The armature of claim 11, wherein said armature is formed from non-austenitic stainless steel so that said surface is substantially resistant to corrosion from the fluid.

13. The armature of claim 12, wherein said tip has a substantially rounded shape and is integral with said armature.

14. The armature of claim 11, wherein said armature is formed from mild steel.

15. The armature of claim 14, wherein said tip is a spherical member formed from stainless steel and attachable to an end of said armature.

16. The armature of claim 14, further including a protectant disposed on said surface so that said surface is substantially resistant to corrosion from the fluid, wherein said protectant is free from zinc.

17. The armature of claim 16, wherein said protectant includes nickel.

18. The armature of claim 16, wherein said protectant is a layer of oxide.

19. The armature of claim 11, wherein said armature includes a body portion having a first diameter, and a mating portion connectable to said body portion and having a second diameter that is less than said first diameter.

* * * * *